INVENTORS: J. J. KLEIMACK
R. L. TRENT
BY David H. Wilson, Jr.
ATTORNEY

INVENTORS: J. J. KLEIMACK
R. L. TRENT
BY David H. Wilson, Jr.
ATTORNEY

United States Patent Office 2,705,768

Patented Apr. 5, 1955

2,705,768

SEMICONDUCTOR SIGNAL TRANSLATING DEVICES AND METHOD OF FABRICATION

Joseph J. Kleimack, Scotch Plains, and Robert L. Trent, Pluckemin, N. J., assignors to Bell Telephone Laboratories, Incorporated, New York, N. Y., a corporation of New York Application May 11, 1953, Serial No. 354,026

22 Claims. (Cl. 317—235)

This invention relates to semiconductive signal translators and their methods of manufacture.

Heretofore semiconductive bodies for electrical translators have been subjected to a complex series of expensive processing steps. They generally were separated from a large mass by a cutting operation, first as slices; the major faces of the slices were lapped, etched and plated with metal; the slices were then diced; individual dice were secured to a metallic base as by soldering; the base and solder joints were masked; the exposed face of each die was etched; and the masking material removed. In as much as the usual slice is of the order of 25 mils thick and the dice are about 50 mils square, careful handling of these elements through the above series of operations is required; further, the wastage of material and partially processed dice is high since a substantial proportion of the original semiconductor material is lost as saw kerf or in the lapping operations and at times the edges of the dice chip to a degree which makes them useless.

The volume of a semiconductive body effective in the performance of the translating function for which it is employed is in many instances a cube of the order of 5 mils on a side. The size of the body has been determined heretofore by the mechanical and manipulative difficulties experienced with smaller bodies. Thus, the usual translator has a semiconductive body much greater than actually necessary to effect its intended electrical functions, often to the detriment of certain electrical characteristics.

This invention has for its object the improvement of the structural and electrical characteristics of electrical translators having semiconductive bodies, and to simplify the manufacture of such translators. More particularly its objects are to reduce the base resistance, to reduce minority carrier storage and minority carrier emission from base connections, increase the allowable power dissipation, reduce the size of the semiconductive body and thus the size of the translator, minimize fabricating steps, facilitate the control of the thickness of semiconductive material, and more efficiently utilize semiconductive material.

One feature of this invention pertains to a translator having a semiconductive body with cleaved surfaces, a contact alloy bonded to said body and at least one other contact connected to a cleaved surface.

Another feature of this invention resides in forming a semiconductive body by alloy bonding a metallic member to a mass of semiconductive material and applying a separating force between the metallic member and the mass. A body of semiconductive material exhibiting excellent translating characteristics adheres to the metallic member and is extracted from the mass.

An additional feature of this invention involves alloy bonding a metallic member to a surface of a semiconductive mass containing one or more grown *n-p* junctions in proximity to the surface whereby a semiconductive body containing these junctions may be extracted from the mass.

Another feature of this invention pertains to controlling the size and shape of the extracted semiconductive body by control of the strain lines produced within the semi-conductive mass from which the body is extracted.

A further feature of this invention resides in incorporating a bond extracted semiconductive body in various structures including varistors, photo-responsive translators, and transistors utilizing grown junctions and alloyed junctions and having bonded and pressure contacts.

The above and other objects and features of this invention will be more fully appreciated from the following detailed description when read in conjunction with the accompanying drawings in which.

In producing translators according to this invention, the semiconductive body is derived from a mass of semiconductive material prepared by techniques known in the art. Where the semiconductive material employed is germanium or silicon, it can be prepared in polycrystalline form as disclosed in Patent 2,602,211, issued July 8, 1952, to J. H. Scaff and H. C. Theuerer; Patent 2,485,069, issued October 18, 1945, to J. H. Scaff and H. C. Theuerer; or W. G. Pfann application Serial No. 256,791, filed November 16, 1951; or in single crystal form as disclosed in the applications of J. B. Little and G. K. Teal, Serial No. 138,354, filed January 13, 1950, and H. C. Theuerer, Serial No. 326,561, filed December 17, 1952. The resulting masses can contain *n-p*, *n-p-n*, or *p-n-p* junctions formed by various means including controlled impurity concentrations, heat treatments and the like.

Figure 1:
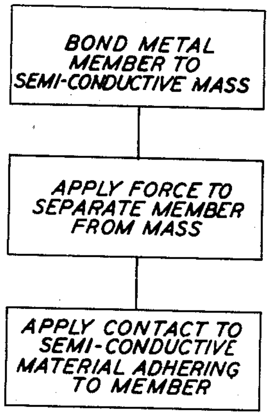
Fig. 1 is a flow chart illustrating a method of producing translators having bond-extracted semiconductive bodies.

Bodies suitable for translators are formed by establishing a bond between a metallic member, which may be employed as an electrode in the translator, and a large mass of semiconductive material. The metallic member is then separated from the mass in a manner which causes some semiconductive material to remain bonded to the member. A translator is fabricated utilizing the metallic member as one electrode and the integral semiconductive body as the semi-conductive element, by applying one or more additional electrodes to the body. This process is set forth broadly in the flow chart of Fig. 1.

One embodiment of the process which can be practiced advantageously involves establishing the bond between a metal member and a semiconductive mass having a suitably prepared surface by forming a zone composed of an alloy of the metal and semiconductor intermediate the elements. Alloy bonds of this nature are disclosed in the applications of W. G. Pfann, Serial No. 184,869, filed September 14, 1950, and Serial No. 184,870, filed September 14, 1950, and G. L. Pearson, Serial No. 270,370, filed February 7, 1952. This type of bond has been found to be quite strong, furthermore it provides a means of controlling the shape and size of the semiconductive body extracted from the matrix since the position and degree of the strain lines produced in the matrix by the bonding operation can be controlled. The body is broken out of the matrix along the bond induced strain lines.

Figures 2, 3, 4:
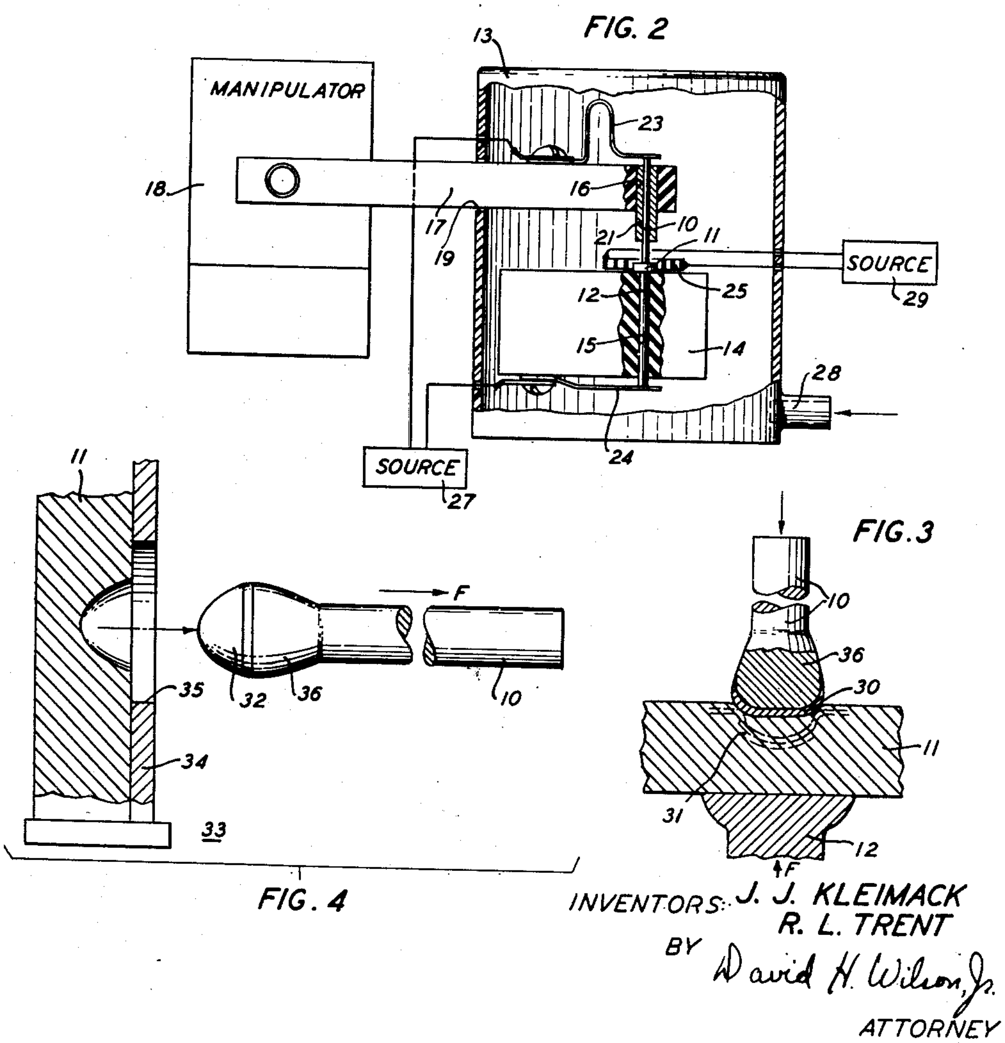
Fig. 2 shows in schematic form the bonding equipment employed in alloy bonding metal members to a semiconductive matrix.
Fig. 3 is an enlarged sectional elevation of a bonded joint as produced in the apparatus of Fig. 2.
Fig. 4 illustrates one method of extracting a bonded body from a semiconductive matrix, showing some of the elements in sectioned elevation.

A bond extracted semiconductive body can be produced in the apparatus disclosed in Fig. 2. For example, a single crystal body of *n* type germanium formed in accordance with the disclosures of the above-mentioned applications and patents can be employed as a matrix 11 for semiconductive bodies by preparing a surface thereof for the bonding of a suitable metallic member 10. The metallic material employed for this bond extraction process in addition to having suitable alloying characteristics with the semiconductor of the matrix, also should induce strains in the matrix outside the alloyed region so that the rupture occurring upon the separation of the member from the matrix is positioned within the matrix and so that semiconductive material will adhere to the extracted bond. Thus, the metal should have an expansion coefficient different from the semiconductor of the matrix and an inherent strength sufficient so that it is not deformed in cooling by the contracting semiconductor without inducing some strains in the semiconductor. Exemplary members include a 20 mil wire of gold, gold alloy or other material such as aluminum which will provide the desired low resistance ohmic contact or diffused junction and contact as dictated by the requirements of the device to be constructed. A clean surface is formed on the crystal or a wafer is cut from the crystal and its major surfaces cleaned by conventional lapping and etching techniques. For example, the surface is lapped with successively finer grades of aluminum oxide and water on cloth, rinsed, subjected to a chemical or electrolytic etch, rinsed and diced in air. The dice constituting the matrix 11 is then mounted in the bonding apparatus.

In forming the bond, heat is applied to the metallic member 10 and germanium body 11 to produce a puddle of a eutectoid alloy immediately under the member by means of radiated heat or electrical resistance heating or both. The member 10 to be bonded is brought into pressure contact with the prepared surface of the semiconductive matrix 11. A second pressure contact is made to the opposite surface of the matrix with a metal electrode 12, such as a platinum rod, which provides electrical contact but does not alloy or bond to the matrix. The material of the member to be bonded preferably forms a eutectoid alloy with the semiconductor and its constituents are further determined by the type of contact desired. For example, where a rectifying contact to *n*-type germanium or an ohmic contact to *p*-type germanium is sought, an electrode of gold or an alloy of gold and some acceptor material such as the elements gallium or indium of the third column of the periodic table with the amount of the acceptor material ranging from about 0.001 to about 10 per cent by weight can be employed. Gold forms a eutectoid alloy with germanium at about 360° C. and acts as an acceptor either alone or when alloyed with an acceptor material. Conversely where a rectifying contact to *p*-type or an ohmic contact to *n*-type germanium is desired, an electrode of gold alloyed with a donor such as antimony, arsenic or phosphorous from the fifth column of the periodic table in a range of percentage by weight of from about 0.001 to 10 per cent is effective. Ohmic or $n^+$ contacts formed by bonding a gold-antimony alloy to *n*-type germanium are particularly satisfactory as holeproof bases thereby permitting the use of very thin germanium bodies in translators such as transistors. The electrode to be bonded may be in the form of a flat or headed end of a wire such as a gold alloy wire of from about 5 to at least 20 mils in diameter.

The bonding is effected in apparatus such as that shown in Fig. 2, wherein means are provided for maintaining the elements in their proper relationship and for applying sufficient heat to raise the joint being bonded to the melting temperature of the eutectoid alloy. This apparatus comprises a housing 13 in which the atmosphere can be controlled. An insulating block 14 containing a bore 15 in which the platinum rod electrode 12 is supported is mounted in the housing. An arm 17 which is cantilever supported from a manipulator 18 adapted for accurate movement in three dimensions projects through an aperture 19 in the wall of housing 13 and carries a contact support near its free end. The contact support comprises a bore 16 which can be axially aligned with the bore 15 arranged to receive a metallic tube 21 having an internal bore with a diameter suitable for receiving the wire electrode 10 to be bonded. Axial pressure is applied to electrodes 10 and 12 by springs 23 and 24 respectively. Spring 23 is so constructed that it can apply the desired contact pressure and feed the electrode 10 into the bonded area a predetermined amount by virtue of the stop action of the upper surface of arm 17. Thus the amount of feed is determined by the separation of the bottom of the spring from the upper surface of the arm. A heating coil 25 is also provided in the illustrated structure in close proximity to the semiconductive matrix and the wire to be bonded to permit modification of the heat applied to the joint during the bonding cycle.

In operation, a typical bonded joint can be made by mounting a 20 mil gold-antimony alloy wire 10 on a single crystal, *n*-type germanium die 11, 50 mils square and 25 mils thick with a contact pressure ranging from about 70 to about 360 pounds per square inch. A platinum or platinum alloy wire 12 of 32 mils diameter provides the second contact. An inert or reducing atmosphere is established in the housing 13 by passing a suitable gas under pressure through inlet 28 and allowing it to escape therefrom through the aperture 19. The gas may be helium, nitrogen or hydrogen. Current from source 29 is passed through the heating coil to raise its temperature to between 450° and 600° C. When this coil is constructed of Nichrome ribbon .015 inch thick, 1/16 inch wire and 6 inches long with an inner diameter of 1/4 inch, it raises the wafer matrix temperature to approximately 300° C. by radiation when an alternating current of 12 to 15 amperes at 2 to 3 volts is applied for about 45 seconds. After the joint has reached a stable temperature, a heavy A.-C. bonding current from 1 to 3 amperes is passed from source 27 through the joint being bonded for about 5 or 10 seconds. This bonding produces a molten gold-germanium eutectic 30 and an enlarged end 36 on the bonded wire.

It is to be understood that the bond can be established by techniques other than those described above and between other materials than those mentioned. For example, a number of bonds can be made simultaneously or in succession to a large matrix such as a slice by utilizing an electrical resistance strip heater underneath the matrix and insulated therefrom by a mica sheet, or no heating other than the resistance heating due to the passage of either alternating or direct currents through the joint need be used. These bonds can be formed with the strain lines in the material defining the surfaces along which the matrix fractures during the extraction process controlled by techniques of the same general nature as employed in the example given. Also, bonds can be formed to the matrix as by soldering and strain lines induced either during the soldering or in a subsequent operation, or the matrix can be fractured as by the application of compressive force without the controlling influence of strain lines and those portions which separate from the matrix with contacts adhering to them can be used in the type of structures described below.

The parameters of the bonding cycle can be employed to determine the size and shape of the semiconductive body which will be extracted from the matrix since both the area of the bond and the position of the thermally induced strain lines are established in bonding. In general it is a fair approximation that the area of the base of the extracted body is about that of the bonded metal contact. The area of this contact is determined by the original size of the member, the pressure applied to it during bonding and the heat cycle. Intermediate the metal member and the semiconductor is a zone of eutectic 30 as shown in Fig. 3 having a thickness which may be from about 0.5 mil to about 2 mils. Under this eutectic zone lies a volume of semiconductive material 32 defined by concentrated strain lines 31, induced in the bonding cycle. These strain lines are produced close to the eutectic when the bond is cooled rapidly and can be concentrated to define a dome encompassing a substantial volume of semiconductor by cooling the bond slowly. Slow cooling is achieved by using a post heating cycle wherein power is fed to a heater such as a coil 25 for a time following the discontinuance of current through the bond, either at a sustained level or at a gradually decreasing level. For example, strain lines which consistently provide extractions having a thickness of 2 to 4 mils of germanium have been made from a single crystal matrix 50 mils square and 25 mils thick in the apparatus shown in Fig. 2 with gold and gold alloy electrodes of 20 mil wire having their ends normal to their axes as follows: the heater 25 is raised to about 600° C. to heat the matrix to about 300° C., the wire 10 is arranged so that approximately a 10 mil length of the wire will be fed to the bond; a bonding current of 1/2 ampere is passed through the joint between the electrode and matrix for about 8 seconds, and when the bonding current is removed the current in the heater is decreased so that it cools to approximately 100° C. in about 30 seconds. Similar results are realized with the above parameters by passing about 4 coulombs through the contact over a period of less than about 8 seconds, for example when a bonding current of 1 ampere for 4 seconds, 2 amperes for 2 seconds or 3 amperes for 1 second is employed. Strain lines which enable extractions of from 10 to 15 mils of germanium to be attained have been made with the same materials and equipment by heating coil 25 to 700° C. and thus the matrix to about 325° C. feeding 20 mils of the wire into the bond zone, bonding with about 8 coulombs over a period of less than about 15 seconds, for example with a current of 0.5 ampere for 15 seconds, 1 ampere for 8 seconds, 2 amperes for 4 seconds, or 3 amperes for 2 seconds, and reducing the temperature of coil 25 to about 100° C. in about 1 minute when the bonding operation is terminated. Similar bonds have been produced solely with externally supplied heat. A 20 mil diameter electrode has been bonded to a 50 mil square matrix of single crystal germanium 25 mils thick by mounting the matrix on a 1 mil thick mica sheet in contact with a tungsten heater 5 mils thick, ¼ inch wide and 1 inch long. A bond having strain lines which are concentrated about 2 to 4 mils from the eutectic is produced by heating the filament at 900° C. for 3 seconds thereby raising the die to about 375° C. This combination cools to about 100° C. in about 30 seconds. The same apparatus will induce strain lines from 10 to 15 mils from the eutectic when the filament is heated to 950° C. for 5 seconds so that the die reaches about 400° C. These elements then cool to 100° C. in about 45 seconds.

The bonded metallic member is next separated from the semiconductive matrix in a manner such that a body of semiconductive material 32 adheres to the member. The body separates from the matrix along cleavage planes to produce surfaces to which either pressure or bonded contacts can be applied directly without the usual steps of lapping and etching.

As suggested above, several methods of separation are available. One which readily lends itself to control involves applying a force to the metallic member normal to and away from the matrix surface. The apparatus shown in Fig. 4 facilitates this method of extraction. It comprises a restraining jig 33 made up of a rigidly maintained plate 34 containing an aperture 35 slightly larger in diameter than the headed portion 36 of the bonded metal member 10. The extraction is accomplished by passing the bonded member through the aperture, drawing the matrix against the face of the plate and exerting a tensioning force on the member of sufficient magnitude to break it away from the matrix. This technique requires a metallic member and bond of sufficient strength to withstand the forces exerted on them during the extraction step so that the rupture occurs in the matrix below the alloy region and semiconductive material adheres to the bond. Gold alloy bonds to germanium have this strength particularly when the germanium has properly induced strain lines.

Another extraction technique can be practiced by applying crushing forces to the semiconductive matrix. Again it is advantageous to have induced strain lines defining the body to be extracted since the material cleaves along these strain lines quite readily.

Figure 5:
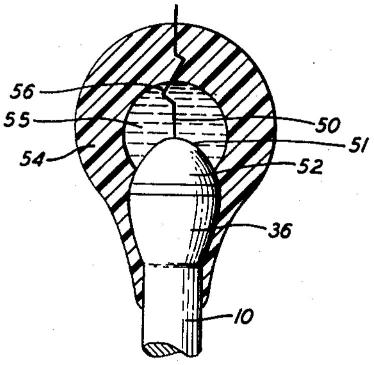
Fig. 5 shows an elevation of a pressure or a bonded contact diode having a bond extracted body.

These extracted bodies are readily incorporated into electrical translator structures. Since the surfaces of the bodies exposed by the extraction are cleaved from the interior of the matrix without the use of any tools which contaminate that surface or produce a disrupted lattice and since the surface cleaves to expose a true lattice structure, contacts either of the pressure point-contact type or bonded type, can be applied directly, thereby eliminating the usual lapping and etching steps and the incidental steps of masking for etching and removing the mask after etching. Thus, a diode structure as depicted in Fig. 5 can be fabricated from an extracted body with no further surface preparation by mounting a restricted area pressure contact 50 or by bonding a gold-alloy wire having the acceptor or donor impurities necessary to produce rectifying contact on the cleaved surface 51 of the extracted body 52. Where this device is to be employed as a detector and rectification is desired only between the contact 50 and surface 51, the bonded contact 10 serves as the base connection to the body and should be of low resistance and have symmetrical characteristics. Units having excellent detector characteristics have been constructed in the form illustrated with a contact composed of a 5 mil, shear pointed, Phosphor-bronze wire or a 2 mil diameter bonded gold-gallium alloy wire, a body bond extracted from an *n*-type single crystal germanium matrix, and a gold-antimony alloy wire bonded to the body to form an ohmic base connection. This construction may be encapsulated in any convenient manner.

Since one of the structural advantages of a bond-extracted body is its small size, a compact encapsulation fully utilizes this advantage. Such an encapsulation is illustrated in Fig. 5. It comprises a resinous bead 54 formed in situ with a cavity 55 encompassing the contact area to enable a pressure contact to be maintained by means of the resiliency of spring section 56 on the extension of contact 50 which remains free in the cavity. The details of this construction and its method of fabrication are more fully set forth in application Serial No. 198,294 filed November 30, 1950 of J. V. Domaleski, E. L. Gartland, and J. J. Kleimack.

A device as shown in Fig. 5 has several advantages from the standpoint of fabrication. In producing conventional structures it is necessary to cut a body from the matrix, usually a slicing and dicing operation, lap both its major surfaces, plate the surface to which the base connection is to be made, solder the plated surface to a base member, mask all but the contact surface, etch the contact surface, remove the masking, and complete the translator assembly. The present method involves preparing a matrix surface for bonding, bonding the base connection by some technique such as alloy bonding, and proceeding with the translator assembly. Further the single bonding surface can be prepared for a number of bonds and may be on an ingot or grown crystal or a slice from such a body.

Electrically bond-extracted devices are advantageous in that they can be produced with a lower base resistance than previous devices. Minority carrier storage effects are materially reduced with this structure. Both of these characteristics enhance the high frequency operation of these devices.

Figure 9:
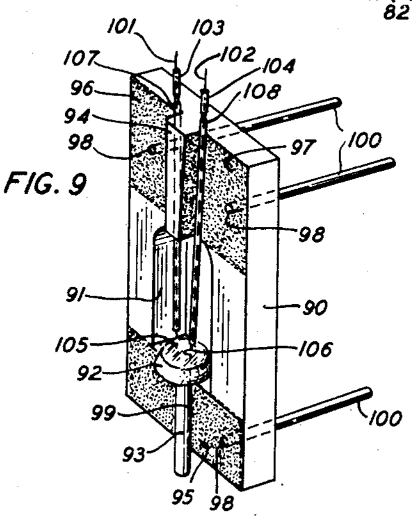

While contacts can be applied directly to the cleaved surfaces of bond extracted bodies, it has been found in the case of pressure contacts that the extremely smooth cleaved surfaces require that the contacts be oriented so that the pressure is normal to the surface to avoid slipping. Where critically spaced contacts are employed on these cleaved surfaces, it is difficult to maintain their spacing unless they are bonded to the surface. Critical spacing between pressure contacts can be maintained by establishing a flat surface on the bond extracted body. Thus, point contact transistor structures can be produced with a high degree of uniformity by lapping and etching a portion of bond extracted bodies similar to that disclosed in Fig. 4 to form a body as shown in Fig. 9 and mounting suitably spaced emitter and collector contacts on this surface. Again fabricating advantages exist in this technique over those employed heretofore. Since the etchants which attack germanium in the manner desired attack gold and the gold-germanium eutectic at a much lower rate, a bath etch can be applied to the bond extracted subassembly without masking.

The structures thus far discussed have employed a bond extracted unit wherein the bond was ohmic and provided the base connection. An ohmic bond can be made to a matrix having *n–p* junctions appropriately positioned with respect to the bonding surface so that, with the addition of electrodes of known forms, various translators can be produced wherein the bonded connection functions as other than a base. Also a junction can be formed simultaneously with the bonding operation, as set forth for example in the above-identified applications of W. G. Pfann, and utilized in translators. Bond extracted bodies either with or without grown or bonded junctions can be combined with pressure contacts of restricted area forming rectifying connections, pressure contacts of large area forming low resistance connections, bonded connections of symmetrical and asymmetrical form, and diffused junctions. Thus, in general bond extracted bodies can be employed to produce almost any previously known electrical translator employing similar semiconductive material in the body.

Figure 6:
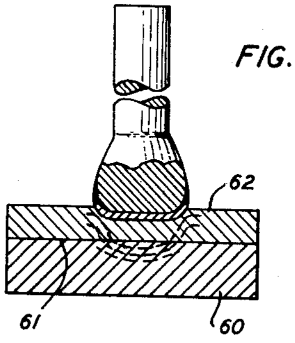
Fig. 6 is a sectioned elevation of a semiconductive body containing an *n-p* junction and having a contact bonded thereto.

As discussed above, the post-heating determines the position of the strain lines induced in the bonding operation; thus a very thin body of semiconductive material is extracted when no post-heating is employed and bodies of substantial depth can be extracted when a post-annealing cycle is employed. This means of controlling the depth of the extraction is particularly advantageous in producing units having grown junctions. Such units are formed by utilizing a matrix 60 having one or more grown junctions 61, preferably plane junctions as shown in Fig. 6. The surface 62 of the matrix to which the bond is to be made is formed parallel and closely spaced to the junctions. The separation of the bonding surface and the grown junctions should be carefully controlled. Thus, where the bonding parameters are chosen so that the eutectic extends 4 mils below the surface of the matrix, that surface should be spaced somewhat more than 4 mils from the first junction. Further, the deepest junction to be utilized should be close enough to the surface so that it will be extracted, this can readily be accomplished in the fabrication of usual structures since the zones bounded by junctions are usually of the order of 2 mils thick and extractions much deeper than this are readily attainable.

Exemplary devices having bond extracted bodies are disclosed in Figs. 7 through 10.

Figure 7:
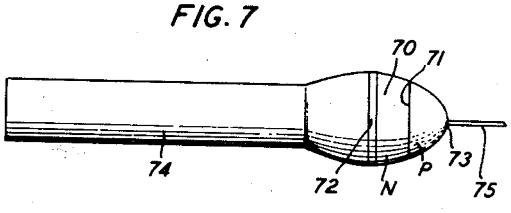
Figs. 7 and 8 are elevations of various structures produced according to this invention.

A *p–n* diode is shown in Fig. 7. It comprises a bond extracted body 70 containing a grown junction 71. Ohmic connections 72 and 73 are made to each side of the junction by bonding a metallic member 74 having a donor action on the *n* side and another 75 having acceptor action to the *p* side.

Figure 8:
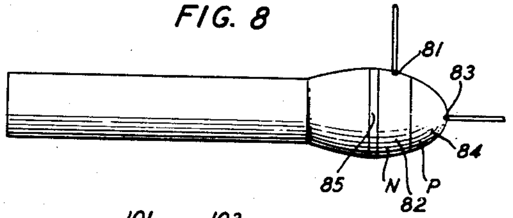

Fig. 8 shows a transistor having a rectifying bonded emitter connection 81 to the *n*-type base section 82 and an ohmic bonded connection 83 to the *p*-type collector section 84. The bond 85 utilized in extracting the semi conductive body provides the ohmic connection to the base section. It has been found that aluminum and gold alloy wires make excellent bonded emitters having characteristics similar to those of point-contact beryllium-copper emitters. Since the emitter bond is to *n*-type material the alloying materials should exhibit acceptor characteristics.

A supporting structure for electrical translators having fragile structures is shown in Fig. 9 in cooperation with a pressure point-contact transistor having a bond extracted semiconductive body. This support is in the form of a frame 90 having an open center 91 in which a portion of a bond extracted body 92 is supported by securing the bonded member 93 to the frame. The electrodes which are to make contact to the body 92 are also secured to the frame in insulated relationship to each other and the bonded member. In the illustrated construction the frame 90 is formed of insulating material such as steatite. It is provided with a plane face having an alignment member 94 protruding therefrom. Conductive coatings 95, 96 and 97 may be provided on the frame by firing silver paste thereon to enable the base, emitter and collector electrodes to be secured thereto. Each conductive coating embraces an aperture 98 in the frame arranged to receive a wire connection 100 whereby the electrodes of the translator can be associated with external circuits. Such a wire connection 100, may be of platinum fired into steatite body when it is formed, or it may be other wire suitable for glass sealing, soldered to the metallic coating or fired into metallic coating. The bonded base structure 93 is secured directly to its conductive coating 95 by solder 99. The emitter and collector 101 and 102 are supported in closely fitting metal tubes 103 and 104 which are positioned to establish the critical spacing with which these electrodes contact the body surface by abutting them against opposite faces of the alignment member 94 projecting from the frame and soldering or otherwise conductively securing them to their respective coatings 96 and 97. These electrodes are made to contact the lapped and etched surface of body 92 by applying axial pressure to their ends to establish a desired deflection in their spring sections 105 and 106 and then securing them in their tubes as by crimping at 107 and 108. The resulting structure is rugged and can readily be mounted in a suitable housing such as a hermetically sealed envelope of glass or metal containing a vacuum or a dry atmosphere.

The form of the mounting shown in Fig. 9 readily lends itself to other types of translators having pressure point contacts and bonded contacts. When bonded contacts are to be made, the structure can be employed as the bonding jig by applying suitable axial compression on the electrodes mounted in tubes 103 and 104 or equivalent supports and by passing the bonding current through the electrode being bonded and the base. The open frame construction also enables an external heater to be associated with the joint being bonded.

Figure 10:
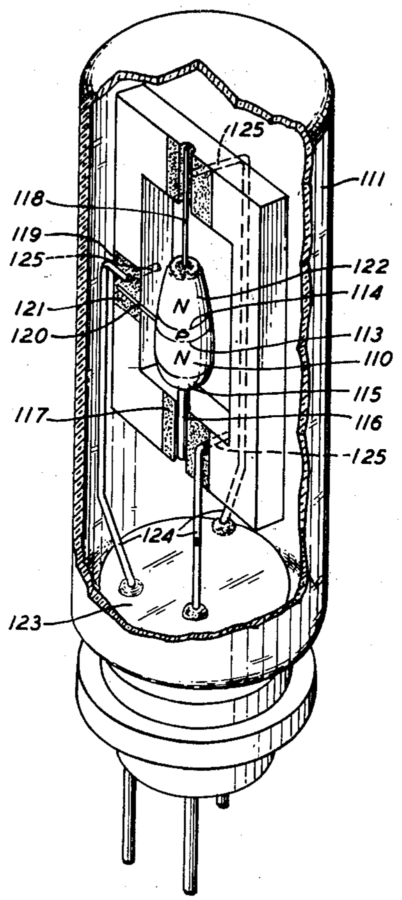
Figs. 9 and 10 are perspectives of additional structures produced by the techniques of this invention associated with supporting and housing means.

Fig. 10 depicts an n-p-n hook collector transistor fabricated from a bond extracted body 110 supported in a mounting which can be utilized to establish the proper position of the electrodes and can be enclosed in a metal envelope 111. In this embodiment a bond extracted semiconductive body 110 containing two junctions 113 and 114 is shown. The bond 115 employed to extract the body constitutes the emitter connection and supports the body on the frame by a solder connection 116 to conductive film 117. The thin zone of p-type material between junctions 113 and 114 constitutes the base section of the unit and is contacted by bonded ohmic connection formed in the manner disclosed in W. Shockley application Serial No. 228,483 filed May 26, 1951. The base lead 120 is electrically and mechanically secured to conductive film 121 on the frame. The hook collector 118 is bonded to *n* section 122 of the body with a rectifying connection. All of the elements of this transistor are supported in the metallic envelope from base 123 by means of stiff leads 124 extending through the insulating bushings in the base to the holes 125 in the frame and each is individually connected to the respective conductive films by low resistance joints.

While the preceding discussion of this invention has been directed principally to the processing and utilization of germanium, it is to be understood that it is equally applicable to silicon or any other semiconductive material to which a suitable bond can be made. Preferably these semiconductive materials should be of a nature which lends them to the controlled formation of strain lines whereby bond extracted bodies can be defined.

It is to be understood that the above-described structures and methods are illustrative of the application of the principles of the invention. Numerous other arrangements may be devised by those skilled in the art without departing from the spirit and scope of the invention.

What is claimed is:

1. The method of fabricating a semiconductive translator which comprises bonding a metallic member to a semiconductive matrix, extracting from the matrix a semiconductive body which adheres to the metallic member, and applying a contact to the extracted semiconductive body.

2. The method of fabricating a semiconductive translator which comprises forming an alloy bond between a metallic member and a semi-conductive matrix, applying a force having a component normal to said matrix on said metallic member to extract a body from the matrix, and applying a contact to the extracted semiconductive body.

3. The method of fabricating a semi-conductive translator which comprises forming an alloy bond between a metallic member and a semiconductive matrix, annealing the matrix in the vicinity of the bond, applying a force to said metallic member having a component normal to the surface of the matrix to extract a semiconductive body from the matrix, and applying a contact to the extracted semiconductive body.

4. The method of fabricating a semi-conductive translator which comprises bonding a metallic member to a single crystal semiconductive matrix, extracting from the matrix a semiconductive body which adheres to the metallic member, and applying a contact to the extracted semiconductive body.

5. The method of fabricating a semiconductive translator containing at least one n-p junction which comprises forming a semiconductive matrix having a n-p junction in proximity to the matrix surface, bonding a metallic member to the matrix on said surface, extracting from the matrix a semiconductive body including material from both sides of said junction, said body adhering to the metallic member, and applying a contact to the extracted semiconductive body.

6. The method of fabricating a semiconductive translator which comprises bonding a metallic member to a semiconductive matrix, extracting from the matrix a semiconductive body, said body adhering to the metallic member, forming a flat surface on the extracted body and applying a contact to the flat surface of the body.

7. The method of fabricating a semiconductive translator which comprises bonding a metallic member to a semiconductive matrix, extracting from the matrix a semiconductive body which adheres to the metallic member, and applying a restricted area pressure contact to the extracted semiconductive body.

8. The method of fabricating a semiconductive translator which comprises bonding a metallic member to a semiconductive matrix, extracting from the matrix a semiconductive body which adheres to the metallic member, forming a smooth surface having a true crystal lattice exposed on said body, and applying a restricted area pressure contact to the surface.

9. The method of fabricating a semiconductive translator which comprises bonding a metallic member to a semiconductive matrix, extracting from the matrix a semiconductive body which adheres to the metallic member, and bonding a contact to the extracted semiconductive body.

10. The method of fabricating an electrical translator having a semiconductive body which comprises forming a clean surface on a semiconductive matrix, mounting the flat end of a wire containing a high proportion of gold on said surface, heating the wire and matrix in the region of their contact to form a eutectic of said gold and semiconductor, advancing the wire into the contact region as the eutectic forms, controllably cooling the matrix to locate the concentration of strain lines induced by the bonding step, applying a force having a component normal to the matrix surface to separate said wire and extract an adhering body of semiconductive material defined by the induced strain lines from said matrix, and applying a contact to said bond extracted body.

11. The method of fabricating an electrical translator having a semiconductive body which comprises forming a clean surface on a semiconductive matrix, mounting a metallic member of a composition which will form a eutectoid alloy with the material of the matrix on said surface, heating the wire, member and matrix in the region of their contact to a temperature below the melting temperature of said eutectoid alloy, passing a current through the contact between the member and matrix to raise the temperature at the contact above the melting point of the eutectoid alloy, advancing the member to the contact region as the eutectoid alloy forms, continuing the heating of the matrix after the cessation of the passage of current through the contact to anneal the matrix, applying a force having a component normal to the matrix surface to said member to separate said member and to extract an adhering body of semiconductive material from said matrix, and applying a contact to said bond extracted body.

12. The method of fabricating a semiconductive translator having germanium body which comprises forming a smooth surface on a matrix of single crystal germanium, etching said surface, mounting the flat end of a wire containing a high proportion of gold on said surface, heating the wire and matrix in the region of their contact, passing a current through said contact to raise the temperature at the contact above the melting point of a gold germanium eutectic, advancing the wire to the contact region as the eutectic forms, cooling the matrix at a controlled rate to concentrate the strain lines induced by bonding, applying force to the wire having a component normal to said surface to separate said wire and extract an adhering body of germanium defined by the induced strain lines from said matrix, mechanically abrading said surface on the bond extracted body, etching said flat surface, and applying a contact to the body surface.

13. The method of fabricating a semiconductive body having an effective thickness ranging from about 2 to about 4 mils which comprises cleaning a surface on a matrix of single crystal germanium, mounting a 20 mil wire containing a high proportion of gold on the matrix surface, heating the wire and matrix in the region of their contact to about 300° C., passing about 4 coulombs through the contact over a period of less than about 8 seconds, advancing about 10 mils of wire into the resulting puddle of eutectic, cooling the region of the contact to about 100° C. in about 30 seconds, and extracting from the matrix a semiconductive body which adheres to the wire.

14. The method of fabricating a germanium body having an effective thickness of 10 to 15 mils which comprises mounting the flat end of a 20 mil wire containing a high proportion of gold on the surface of a germanium single crystal matrix, heating the wire and matrix in the region of their contact to about 325° C., passing about 8 coulombs through the contact in a period of less than about 15 seconds, adding about 20 mils of the wire to the molten puddle of eutectic formed during the period current is passed through the contact, cooling the region of the contact to about 100° C. over a period of about one minute subsequent to the cessation of the passage of current, and applying a force to the wire having a component normal to the matrix surface to separate said wire and extract an adhering body of germanium from said matrix.

15. The method of fabricating an electrical translator having a germanium body having an effective thickness from about 2 to about 4 mils which comprises mounting the flat end of a wire containing a high proportion of gold on the surface of the matrix, heating the wire and matrix in the region of their contact to about 375° C. for of the order of three seconds to form a gold germanium eutectic, cooling the region of the contact to about 100° C. in about 30 seconds, applying a force to said wire having a component normal to the surface of the matrix to separate the wire and an adhering body of germanium from the matrix, and applying a contact to said bond extracted body.

16. The method of fabricating an electrical translator having a germanium body having an effective thickness from about 10 to 15 mils which comprises mounting the flat end of a wire containing a high proportion of gold on the surface of the matrix, heating the wire and matrix in the region of their contact to about 400° C. for of the order of five seconds to form a gold germanium eutectic, cooling the region of the contact to about 100° C. in about 34 seconds, applying a force to said wire having a component normal to the surface of the matrix to separate the wire and an adhering body of germanium from the matrix, and applying a contact to said bond extracted body.

17. An electrical translating device comprising a bond-extracted semiconductive body, a metallic member integrally associated with said bond to constitute one electrode to said body, and at least one additional electrode engaging said body at a point spaced from said bond.

18. An electrical translating evice comprising a bond-extracted semiconductive body, a eutectoid alloy bond between said body and one electrode to said body, and at least one additional electrode engaging said body at a point spaced from said bond.

19. An electrical translating device comprising a bond-extracted germanium body, a conductive member integral with said bond constituting one electrode to said body, and at least one additional electrode engaging said body at a point spaced from said bond.

20. An electrical translating device comprising a bond-extracted semiconductive body containing a *n—p* junction, a conductive member integral with said bond to constitute one electrode to said body, and at least one additional electrode engaging said body at a point spaced from said bond.

21. In combination a rigid frame of insulating material containing an aperture, a semiconductive body, a first electrode connected electrically and mechanically to said body, a plurality of electrically separate conductive surfaces on said frame, said first electrode being mechanically and electrically connected to one of said surfaces to support said body in registry with said aperture, a spacer member on said frame, at least two electrode supports abutting opposite sides of said spacer and electrically connected to respective conductive surfaces on said frame, electrodes secured to said supports and engaging said body, a casing encompassing said frame, said semiconductive body and electrodes, and leads extending from said conductive surfaces through the wall of said casing and supporting said frame, semiconductive body and electrodes within said casing.

22. A semiconductive translator having at least two critically spaced contacts, comprising a rigid member having a plane face, said face having an aperture therein, a semiconductive body, a first electrode secured to said body, said first electrode being mechanically secured to said plane face of said member to support said body in registry with said aperture, a spacer projecting from said plane face of said member and a pair of electrodes engaging said semiconductive body said electrodes being secured to said member and being electrically isolated from each other and said first electrode on opposite sides of said spacer.

References Cited in the file of this patent

UNITED STATES PATENTS

| | | |
|---|---|---|
| 2,654,059 | Shockley | Sept. 29, 1953 |
| 2,664,528 | Stelmak | Dec. 29, 1953 |
| 2,666,150 | Blakely | Jan. 12, 1954 |